(12) United States Patent
Zucca et al.

(10) Patent No.: US 10,864,495 B1
(45) Date of Patent: Dec. 15, 2020

(54) CAVITATION APPARATUS, CONFIGURED TO PERFORM MULTIPLE SIMULTANEOUS CAVITATIONS

(71) Applicants: Tullia Zucca, Comazzo (IT); Bruno Vaccari, Rome (IT)

(72) Inventors: Tullia Zucca, Comazzo (IT); Bruno Vaccari, Rome (IT)

( * ) Notice: Subject to any disclaimer, the term of this patent is extended or adjusted under 35 U.S.C. 154(b) by 87 days.

(21) Appl. No.: 16/054,318

(22) Filed: Aug. 3, 2018

(51) Int. Cl.
*B01J 19/00* (2006.01)
*C02F 11/00* (2006.01)
*C02F 1/34* (2006.01)
*C02F 9/00* (2006.01)

(52) U.S. Cl.
CPC .............. B01J 19/008 (2013.01); *C02F 1/34* (2013.01); *C02F 9/00* (2013.01); *C02F 11/00* (2013.01); *C02F 2303/26* (2013.01)

(58) Field of Classification Search
CPC ... B01J 19/008; C02F 1/34; C02F 9/00; C02F 2303/26
See application file for complete search history.

(56) References Cited

U.S. PATENT DOCUMENTS

| | | | | |
|---|---|---|---|---|
| 4,466,741 A * | 8/1984 | Kojima | ................. | B01F 5/0615 138/37 |
| 8,603,198 B2 * | 12/2013 | Gordon | ................. | B01F 5/0644 366/176.1 |
| 2005/0067122 A1 * | 3/2005 | Kazem | ................ | B01F 7/00816 162/29 |
| 2013/0161262 A1 * | 6/2013 | Henley | ..................... | C02F 9/00 210/695 |

* cited by examiner

*Primary Examiner* — Lessanework Seifu
(74) *Attorney, Agent, or Firm* — John Rizvi; John Rizvi, P.A.—The Patent Professor®

(57) ABSTRACT

A cavitation apparatus capable of performing multiple, different-type cavitation processes taking place simultaneously in the same geometric space, thereby obtaining an effective cavitation process that is significantly faster than those provided by conventional cavitation apparatus. The cavitation apparatus can include consecutive and/or simultaneous cavitation units which are configured to carry out consecutive and/or simultaneous cavitation processes on a material flowing through the apparatus, such that effects of one or more prior cavitation processes are present in the material while the material is subjected to one or more further cavitation processes within the apparatus, enhancing the cavitation effects in a reduced amount of time and increasing productivity of the apparatus. In some embodiments, the apparatus can perform seven cavitation processes, of four different types.

20 Claims, 5 Drawing Sheets

CAVITATION APPARATUS, CONFIGURED TO PERFORM MULTIPLE SIMULTANEOUS CAVITATIONS

FIELD OF THE INVENTION

The present invention generally relates to a cavitation apparatus, and more particularly, to a cavitation apparatus which is capable of performing multiple, different-type cavitation processes taking place simultaneously in the same geometric space, thereby obtaining an effective cavitation process that is significantly faster than those provided by conventional cavitation apparatus.

BACKGROUND OF THE INVENTION

Cavitation is known since the late nineteenth century. Cavitation is a phenomenon which involves the rapid formation and implosion of cavities or bubbles in a low-pressure area in liquids. In general, cavitation is caused by applying forces onto a low-pressure liquid which cause the liquid pressure to drastically and rapidly drop, as a consequence of which the liquid vaporizes and cavities containing vapor are formed. When forces cease or the bubbles travel outside the area of the liquid which is being subjected to said forces, the vapor inside the cavity condenses and, in consequence, the cavity or bubble implodes. The process of cavitation bubble generation and the subsequent growth and collapse of the cavitation bubbles results in very high energy densities and very high local temperatures and local pressures at the surfaces of the cavitation bubbles for a very short period of time. Specifically, when they collapse, the cavitation bubbles energetically force the liquid into very small volumes, thereby creating spots of high temperature and emitting shockwaves throughout the liquid. Conditions in the collapsing cavitation bubbles can reach 5000° C. and 1000 bar in just microseconds, parting from initial conditions of room temperature and 1 bar, respectively ("The temperature of cavitation"; Flint E B, Suslick K S; Science, 1991 Sep. 20; 253(5026):1397-9; and "Ultrasonics: Fundamentals, Technologies, and Applications, Third Edition"; Dale Ensminger, Leonard J. Bond; CRC Press, 19 Sep. 2011).

Cavitation can be created in many different ways, depending on the type of forces exerted on the liquid. For instance, specific types of cavitation include hydrodynamic cavitation, acoustic cavitation, laser-induced cavitation, etc. In hydrodynamic cavitation, the liquid is forced to pass into one or more dynamic or static cavitation elements having a particular geometry. These elements can allow to maximize the confining of cavitation within a controlled region of the liquid. In acoustic cavitation, the bubbles are generated by an ultrasonic acoustic wave, so the bubbles are formed and implode thanks to the sinusoidal wave which acts directly on the liquid to be treated. In laser-induced cavitation, the fluid is radiated by high-intensity laser pulses. Under such extreme conditions, breakdown of the fluid happens and bubbles are formed.

When cavitation takes place in a liquid-solid slurry material (i.e. a semisolid material comprising a liquid medium containing solids or solid particles), cavitation causes a series of unique physical phenomena that affects the solids in the liquid medium. On one hand, as mentioned heretofore, implosion of the cavitation bubbles causes microjets and high-energy shockwaves in the liquid medium, as well as high local temperatures and pressures. The power of the shockwaves generated by the cavitation process uniformly disrupts everything in their path. Thus, by means of cavitation, any solid particles in the slurry are fractured into even smaller particles. The microjets and high-energy shockwaves induce mechanical damage, such as material erosion and pitting, in the surface of the particles, reducing the particles from a macroscopic to a microscopic dimension, thereby increasing the contact area with said surface. Furthermore, cavitation creates high-velocity inter-particle collisions of solid particles contained in the slurry material that may also alter the morphology and size of the particles dramatically. Smaller particles obtained by cavitation result in a better dispersion and greater surface area, which may benefit and enhance any chemical reactions which are to take place or be carried out in the slurry as part of an industrial process.

Cavitation is occasionally described as being a physical phenomenon somewhat similar to boiling. However, in boiling, temperature increase causes the vapor pressure to rise and eventually exceed the pressure of the liquid, creating a bubble that is mechanically stable because it is formed of vapor at the same pressure as the surrounding liquid. In cavitation, however, the pressure of the liquid drops suddenly, while the temperature and tension of the vapor remain constant as the life of the bubbles is very short (cavitation bubbles only last while the conditions that caused the bubbles are still present). Therefore, at the implosion of the microbubble, fluid particles (e.g., containing a macro organic molecule) pass suddenly from a state of very high pressure to one of environmental pressure. Within a controlled cavitation apparatus, just as quickly the conditions for the formation of a new bubble are established in the environment and, therefore, the cycle is repeated as long as the apparatus is in operation, affecting each molecule that is spatially located at that particular point. Thus, each molecule of the fluid undergoes this frenetic process of microbubble creation and implosion.

The micro-cavity formation or cavitation process is mainly apparent where liquid velocity is maximal. Where liquid velocity is maximum, liquid mass loses continuity, resulting in a gaseous, oxygen-rich "foam" due to the vapor that is released as a result of cavitation. This foam, in case of uncontrolled cavitation, can be extremely erosive and corrosive with metals, causing hydrolysis, oxidation, polymerization and depolymerization. The very quick collapse of the micro-cavities generates very high pressure and high energy concentration micro-jets in very short times and spaces which, if not controlled, can also cause serious damage to the machines that trigger the cavitation phenomenon.

Cavitation can be controlled by inducing cavitation in the liquid medium instead of allowing cavitation to self-develop. If cavitation is controlledly performed, the otherwise potentially destructive effects of cavitation can be exploited advantageously.

For example, if there is organic material in the fluid, cavitation results in a partial physical de-structuring, a cell wall lysis, and the consequent release of intracellular content from the organic material. This results in increased availability of cellular juices, accelerating hydrolysis processes and, consequently, accelerating the anaerobic digestion process as a whole. It has been observed that cavitation of fluids containing organic materials can accelerate the rate of bacterial degradation up to 4 or 5 times with respect to conventional bacterial degradation procedures. Furthermore, the enormous forces brought into play during the cavitation phenomenon allow for extremely effective and far better mixing processes than those obtained with conventional technologies, as the reduction into microscopic parts of the solids present in the cavitated liquid increases the area of superficial contact of said solids. Further, controlled cavitation can be applied to all processes of extraction of natural substances and to all processes of treatment, preservation and emulsion of liquids, because cavitation does not damage the original active ingredients of the original substance, unlike what happens with other conventional methods of extraction, pasteurization and fermentation. Cavitation can also be used to reduce volatile gases, break apart gluten, puncture microbes' membranes, and sterilize wort. In another example, controlled cavitation is used industrially as a pretreatment for the disintegration of biomass in biogas and bioethanol production plants, increasing the specific surface of the particles present in the liquid as well as the volume of the pores and thus allowing to increase the total biogas production. This effect leads to lower fermentation times, greater methane production, and the possibility of treating fibrous biomass, while optimizing the biogas plants at their best. However, because cavitation is a slow and inefficient process, its industrial applicability is limited in practice.

It is also known that, due to the dipolar nature of water, most liquids can be partially aligned by an electric field. This may be easily shown, for instance, by the movement of a stream of water by an electrostatic source. Static magnetic effects have been shown to cause strengthened hydrogen bonding and an increase in the ordered structure of water formed around hydrophobic molecules and colloids, as shown by the increase in fluorescence of dissolved probes. Even very small magnetic fields may affect the solubility of gases in seawater (solubility increasing with the magnetic field (20-50 µT), likely due to their effect on the clathrate stability. This reinforces the view that it is the movement through a magnetic field, and its associated electromagnetic effect, that is important for disrupting the hydrogen bonding. Magnetic fields can also increase proton spin relaxation, which may speed up some reactions dependent on proton transfer. Treatment of water with magnetic fields of about 1 Tesla increases the strength of mortar due to its greater hydration.

Accordingly, there is an established need for a cavitation apparatus which solves at least one of the aforementioned problems. Specifically, there remains a need for solutions which accelerate cavitation such that it can be efficiently and successfully incorporated to a wide variety of industrial applications.

SUMMARY OF THE INVENTION

The present invention refers to a cavitation apparatus capable of performing multiple, different-type cavitation processes taking place simultaneously in the same geometric space, thereby obtaining an effective cavitation process that is significantly faster and more powerful than those provided by conventional cavitation apparatus. The cavitation apparatus can include consecutive and/or simultaneous cavitation units which are configured to carry out consecutive and/or simultaneous cavitation processes on a material flowing through the apparatus, such that effects of one or more prior cavitation processes are present in the material while the material is subjected to one or more further cavitation processes within the apparatus. This synergy between the different cavitation processes enables obtaining an enhanced overall cavitation in a reduced amount of time and therefore allows to obtain an extremely productive apparatus. In some embodiments, the apparatus can perform seven cavitation processes, of four different types.

The apparatus finds application in chemical, pharmaceutical, fuel, food and other industries to prepare solutions, emulsions and dispersions, and to improve mass and heat transfer processes. Streamlining is obtained by passing a fluid through different types of cavitation units comprised in the cavitation apparatus. The fluid may be subjected to one or more cavitation sessions. For example, the fluid may be subjected to more than one cavitation session by looping the fluid from an outlet of the cavitation apparatus into an inlet of the cavitation apparatus for re-processing. Chemicals or gas can be added to the fluid to improve the desired effect. Through the cavitations, a complex fluid composed of many individual compounds can be modified using cavity implosion energy to improve the homogeneity, viscosity and/or other physical characteristics of the fluid altering its chemical composition and converting compounds to obtain different products. The cavitation processes can accelerate numerous reactions and processes using the energy released upon the collapse of cavities in the flow. The synergistic cavitation effects provided by the various cavitation processes within the apparatus coexist in an entirely harmonic way, to such an extent that the apparatus experiences no significant vibrations. The synergistic cavitation processes significantly increase the efficiency of the chemical, physical and biological processes that take place inside the apparatus.

The apparatus of the present disclosure can be used to increase the efficiency of any kind of chemical, physical or biological process; i.e., the apparatus allows to more efficiently complete chemical processes and thus, by using the apparatus, chemical processes can be carried out in shorter times than if they were carried out with traditional systems. Using the apparatus leads to higher yields in the same time frame. Furthermore, incorporating the apparatus to an industrial plant extends the life cycle of the plant as, by adding the apparatus, the working conditions require less drastic temperatures and pressures. In addition, incorporating the apparatus to an industrial process may allow such process to be completed without the need for catalysts and/or additives. Further, incorporating the apparatus to an industrial process which produces a product may drastically reduce the energy consumption required to obtain a certain quantity of said product. For instance, the apparatus can also function as a pressure diffuser, which reduces energy consumption as the apparatus allows a remarkable recovery of the pressure drop due to the load losses of processed liquid. In other words, a part of the fluid pressure losses in crossing the apparatus itself it is recovered at the exit of the apparatus. The apparatus can also polarize salts and polar molecules which may often be present in the liquid or other material passing through the apparatus; polarization is further accentuated by the optional presence of magnets alongside the fluid or other material flow.

The apparatus is composed of several parts. Depending on the liquid to be treated and in order to obtain the best streamlining, parts can be removed or assembled in different order. The apparatus may be compact or small-sized, and can be a part of a whole existing process, can run autonomously or can be a stand-alone process that interacts with other processes. The apparatus and its accessories may or may not be placed in one or more containers of any size. If placed in one or more containers, the container(s) may or may not allow access to the apparatus and its accessories or may allow limited access to components that require maintenance. If placed in one or more container(s), the container(s) can be equipped with insulation, a cooling system, an electrical system, an independent power supply system, battery systems and/or any other accessories that adapt the container(s) to the required processes.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
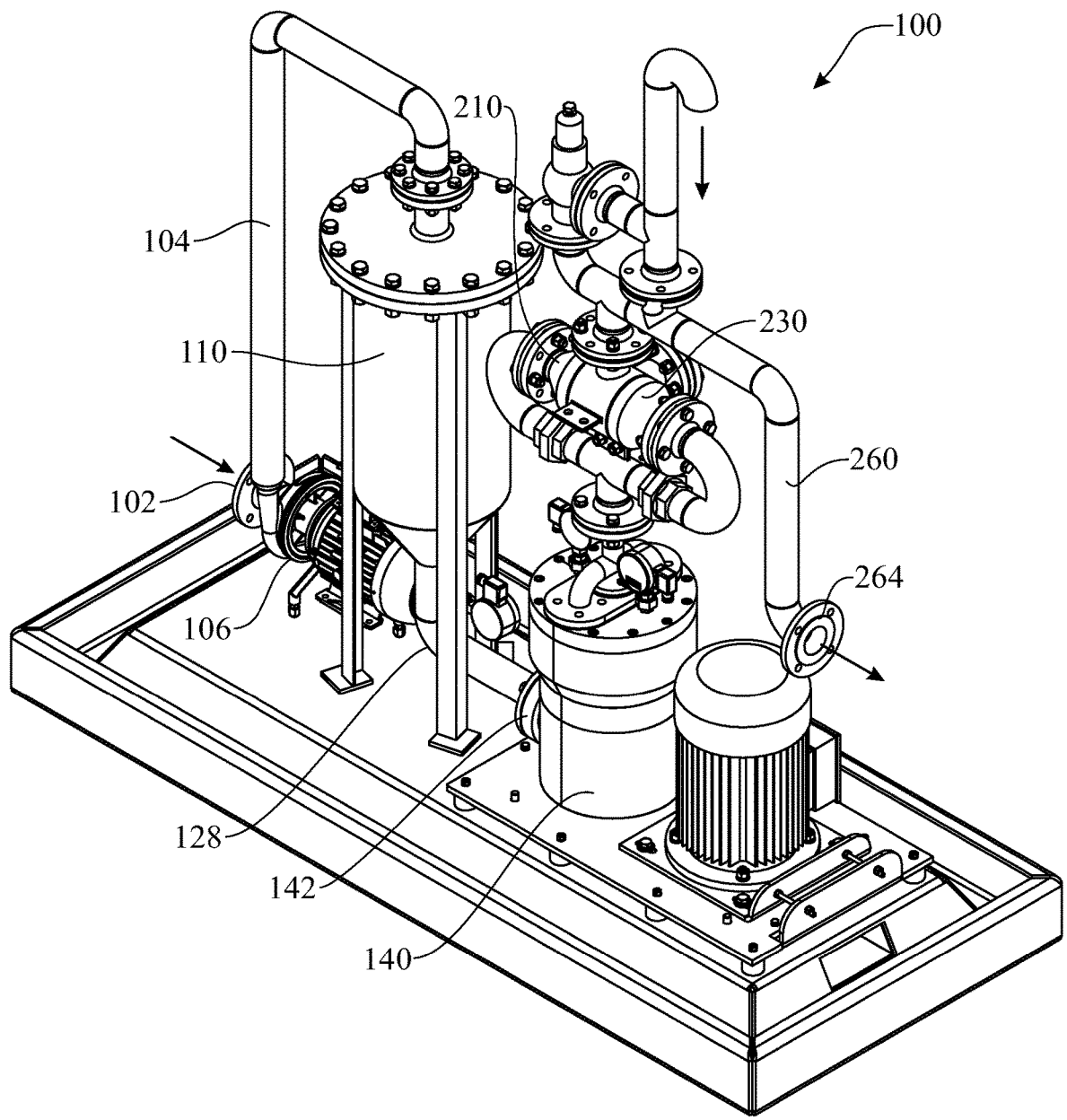
FIG. 1 presents an isometric view of a cavitation apparatus in accordance with an illustrative embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a cavitation apparatus which is capable of performing multiple, different-type cavitation processes on a liquid material or matrix (e.g. a biomass or other extremely viscous liquid) or liquid-solid material or matrix (e.g., a slurry). The multiple cavitation processes take place simultaneously in the same geometric space, i.e. in the same geometric volumes, and the liquid or liquid-solid material or matrix is streamlined through the multiple cavitation processes. Thus, the effects of the different cavitation processes synergistically add to each other, enhancing the result, thereby obtaining an overall or effective cavitation process that is significantly faster than those provided by conventional cavitation apparatus.

The liquid or liquid-solid material or matrix is hereinafter referred to generally as 'matrix'. Furthermore, the liquid or liquid-solid matrix may be hereinafter referred to generally as 'liquid'; i.e., unless expressed otherwise, a 'liquid' matrix may be understood as a matrix consisting of liquid(s) only or comprising liquid(s) (and solids). As will be described in detail hereinafter, a preferred embodiment of the invention is related to a method and apparatus in which seven cavitation processes of four different types are carried out in the same geometric space.

The method and apparatus can be used to increase the efficiency of any kind of chemical, physical and/or biological process or reaction in a wide variety of industrial sectors or industries. For instance, the method and apparatus can be applied in chemical, pharmaceutical, fuel, food and other industries to prepare solutions, emulsions and dispersions, to improve mass and heat transfer processes, in gas/liquid mixing processes, liquid/liquid mixing processes, liquid/solid mixing processes, hydration processes of gels and rubbers, emulsification processes, homogenization processes, pasteurization processes, intensifications processes, etc.

With reference initially to FIG. 1, a cavitation apparatus 100 is shown in accordance with an illustrative embodiment of the present invention. The cavitation apparatus 100 comprises an inlet 102 in fluid communication with a fluid conduit 104. The inlet 102 is configured to allow the feeding of a liquid or liquid-solid matrix to the cavitation apparatus 100. A pump 106 can be connected to the fluid conduit 104 and provided for pumping the liquid or liquid-solid matrix from the inlet 102 into and through the fluid conduit 104, in order for the matrix to be processed by the cavitation apparatus 100 as will be described in detail hereinafter. In addition to pumping the matrix, the pump 106 enables a controlled liquid pressure of the matrix flowing within the fluid conduit 104 towards subsequent parts of the cavitation apparatus 100.

Figure 2:
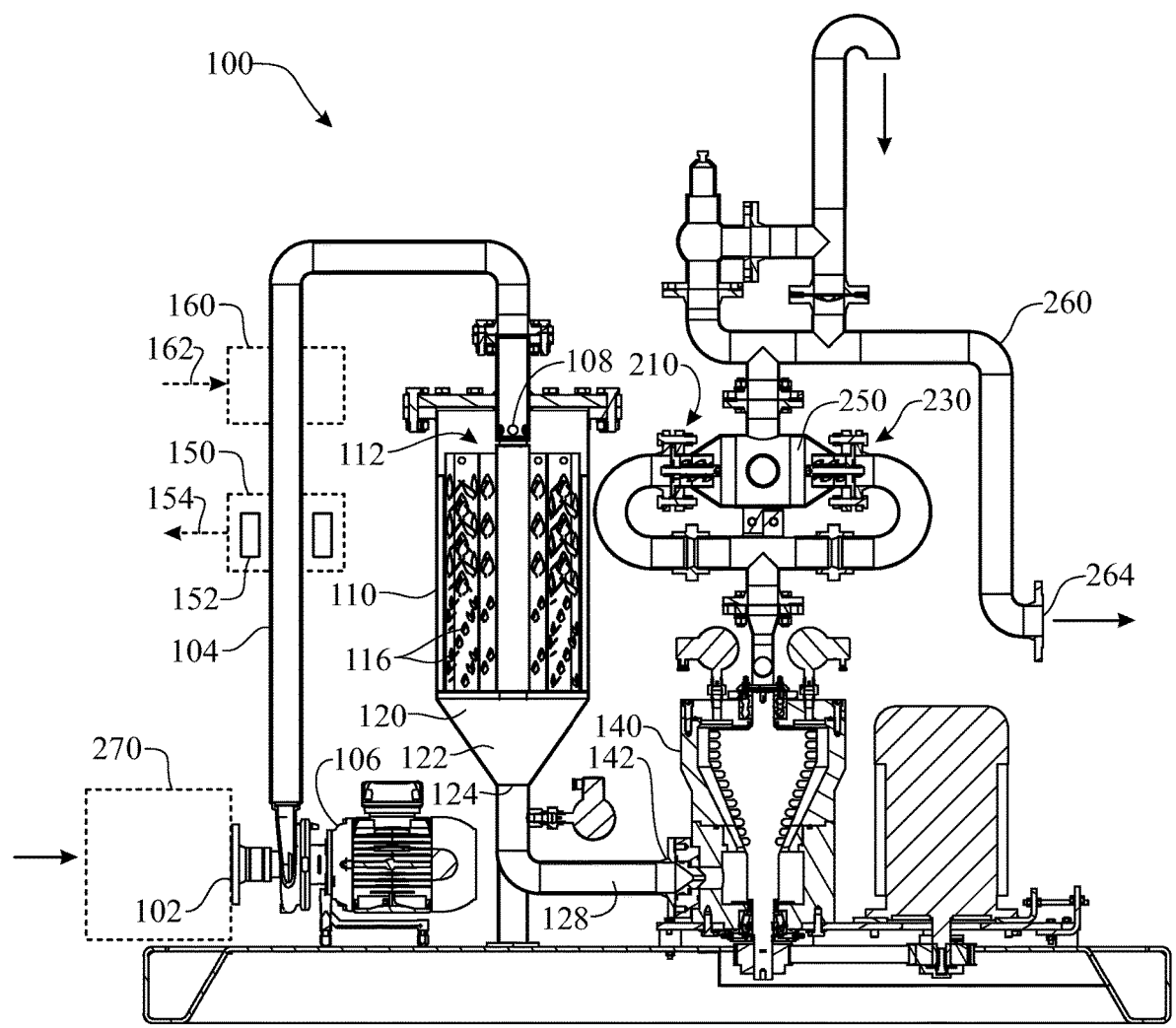
FIG. 2 presents a front elevation view, shown partially in cross section, of the cavitation apparatus of FIG. 1.

As shown in FIG. 2, in some embodiments, a magnetic unit 150 comprising one or more magnets 152 can be provided alongside the fluid conduit 104, such that the matrix flowing through the fluid conduit 104 passes proximate to the one or more magnets 152. The one or more magnets 152 can be configured to retain suspended metal particles in the fluid, i.e. to remove said suspended metal particles from the fluid flow as indicated by outgoing arrow 154, thus serving as magnetic filters. The one or more magnets 152 can also be configured to polarize molecules contained in many different fluid matrixes (e.g., fuel oils), where such polarization can work synergistically with the controlled cavitation processes which take place downstream of the magnetic unit 150 and which will be described hereinafter. The one or more magnets 152 can include super neodymium magnets. The super neodymium magnets can be configured to alter the magnetic field of the treated liquids making them homogeneous and also acting on the calcium deposit inside the apparatus. In some embodiments, the one or more magnets 152 may include a magnet having a strength of 12,000 gauss, for instance and without limitation.

In some embodiments, a feeding unit 160 may be provided in fluid communication with the fluid conduit 104. The feeding unit 160 is configured to allow the addition of at least one gas and/or chemical 162 to the matrix flowing though the fluid conduit 104. For example, in a gold mining industrial process in which a gold-containing liquid-solid slurry matrix is processed with cyanides, a feeding unit 160 may add carbon dioxide, compressed air and/or compressed oxygen and/or ozone to the gold-containing matrix in order to initiate the cyanide transformation reaction. In some embodiments, the at least one gas and/or chemical 162 may include at least one gas and additives to facilitate the dispersion of the gas in the liquid. In the cavitation apparatus 100, additives are regulated similarly to conventional chemical plants, but are more efficient due to the efficiency increase provided by the multiple cavitation processes that will be hereinafter described.

Figure 3:
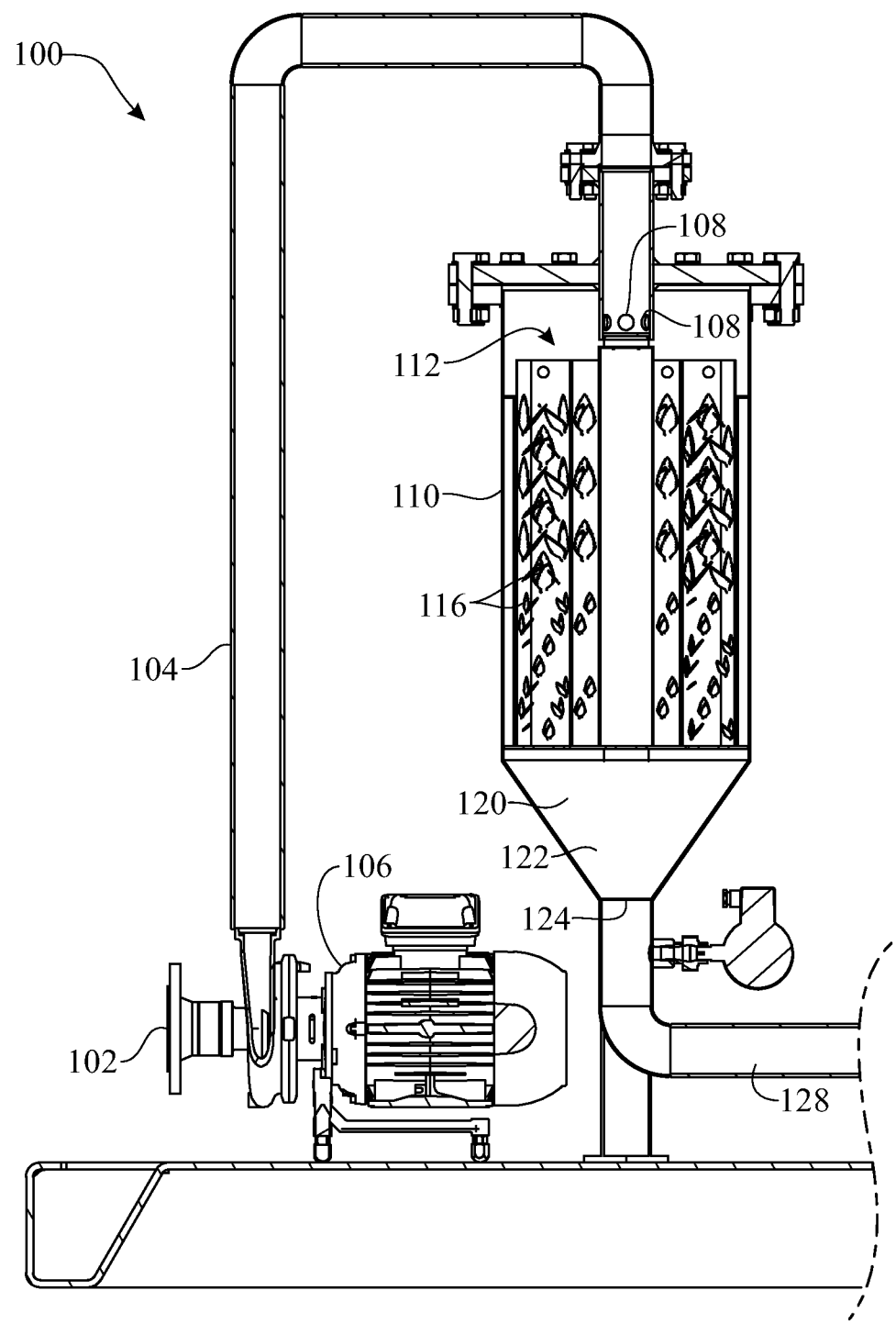
FIG. 3 presents an enlarged, partial view of FIG. 2, illustrating the cavitation apparatus inlet, fluid conduit and first reactor of the cavitation apparatus.

As shown in FIGS. 1-3, a first reactor 110 is provided in fluid communication with the fluid conduit 104. As best shown in the enlarged view of FIG. 3, the liquid or liquid-solid matrix flowing through the fluid conduit 104 exits the fluid conduit 104 and enters an internal space or chamber 112 of the first reactor 110 through in inlet of the first reactor 110, and more specifically, through a set of one or more openings 108 provided at a first or top end of the fluid conduit 104. A plurality of obstacles 116 are arranged within the internal chamber 112, partially blocking the flow of matrix through the internal chamber 112 from the inlet of the first reactor (i.e. openings 108) towards a second or bottom end 120 of the first reactor 110, and causing a mixing or homogenization of the matrix as the matrix flows through the internal chamber 112. The obstacles 116 can be shaped in the form of leaves (as shown) or droplets, for instance and without limitation. A matrix collector 122 is provided at the second or bottom end 120 of the first reactor 110 and is configured to collect the liquid or liquid-solid matrix and deliver the same through an outlet 124 of the first reactor 110 and into a second fluid conduit 128. The first reactor 110 thus performs the function of a static mixer. Such a mixer can be useful, for instance, in processes that contemplate the formation of crystalline chemical elements, and the mixer has the ability to favor the formation of crystals in reagents introduced upstream, which further accelerate chemical reactions due to the sharp-angled or rough geometry of the crystals and the fact that the crystals precipitate subtracting themselves from the chemical reaction equilibrium. It must be noted that the value of a reaction constant, which must always remain the same, is proportional to the product of the values of the reaction products and inversely proportional to the product of the reagents. If the value of the reaction products or the value of the product of the reagents decreases due to the precipitation of the crystals, the other value accordingly decreases and therefore the chemical reaction of transformation of the reagents is favored and accelerated.

Alternative embodiments are contemplated, however, in which the cavitation apparatus 100 may not include the first reactor 110, and wherein an alternative mixer may or may not be included. For instance, the disclosed first reactor 110 may be replaced by a different mixer if the matrix is extremely poorly flowing (e.g., a biomass or untreated sludge). In another example, the first reactor 110 can be replaced by or provided in addition to a grinding pump for obtaining a fine matrix with homogeneously-sized solid particles prior to cavitation; in grinding the matrix, the pump can also perform an initial mixing of the matrix.

Figure 4:
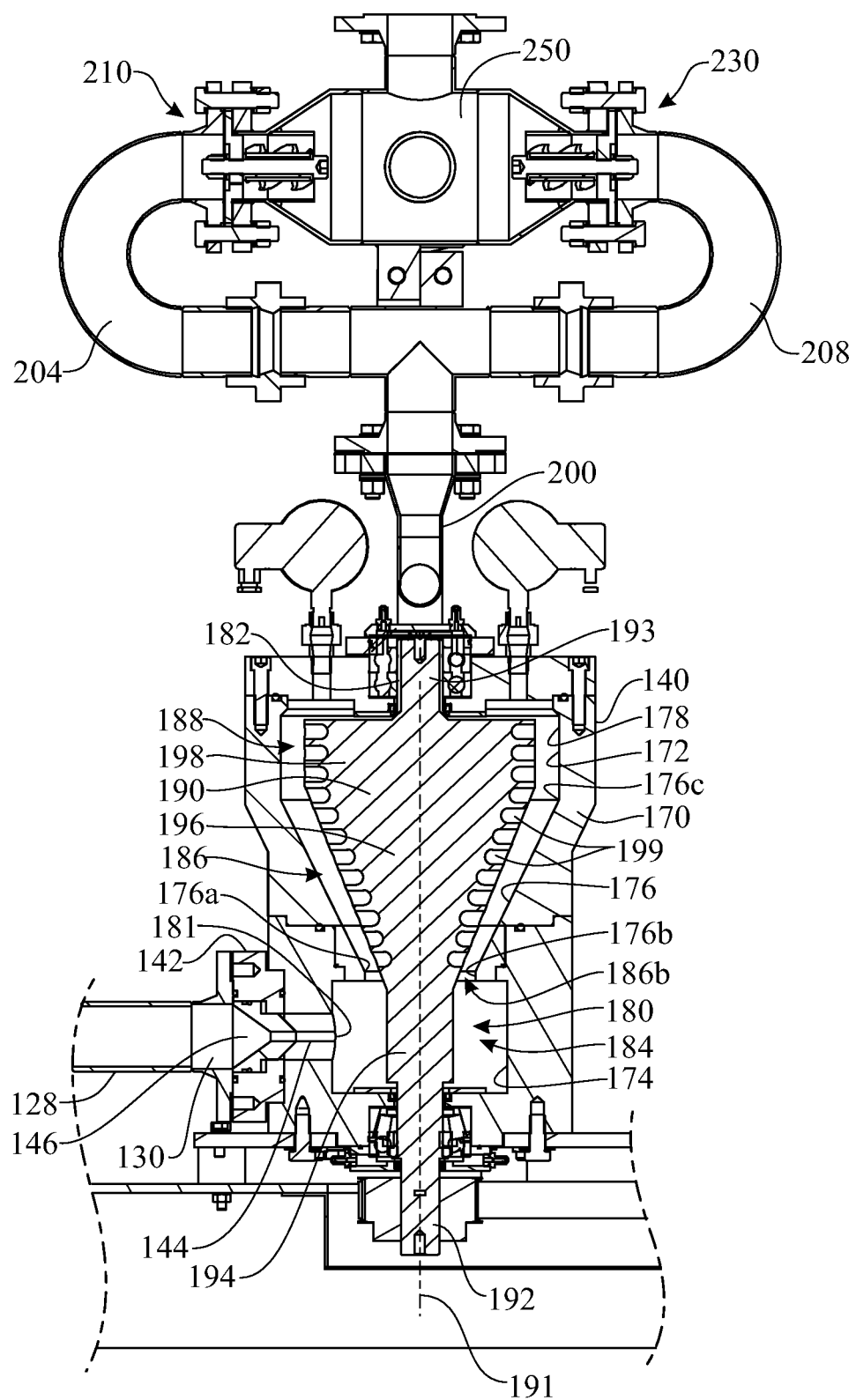
FIG. 4 presents an enlarged, partial view of FIG. 2, illustrating the second reactor and the first and second lateral chambers of the cavitation apparatus.

With reference to FIG. 1, once a homogeneous mixing is obtained within the first reactor 110, the matrix is delivered to a second reactor 140 via the second fluid conduit 128. As will be described in detail hereinafter, the second reactor 140 constitutes a cavitation unit configured to cause the cavitation of the matrix flowing therethrough. As shown in FIG. 1, the second fluid conduit 128 is connected to and in fluid communication with an inlet 142 formed in the second reactor 140. As best shown in FIG. 4, the inlet 142 is such that the matrix flows from a first passageway having a wider internal diameter or cross-sectional area to a second passageway having a narrower internal diameter or cross-sectional area than the first passageway. For example, in the present embodiment, the wider, first passageway is provided by a first section 130 of the inlet 142 which has substantially a same internal diameter as the second fluid conduit 128 that is connected to the inlet 142. In turn, the narrower, second passageway is provided by an inlet passageway 144 comprised in the inlet 142. The inlet 142 further comprises a transition cavity 146 arranged between and providing fluid communication between the wider, first section 130 of the inlet 142 and the narrower, inlet passageway 144. In some embodiments, the transition cavity 146 can be, for instance and without limitation, conically shaped, as shown, to provide a transition between a cylindrical first passageway or first section 130 and a cylindrical second passageway or inlet passageway 144 having a smaller diameter than the cylindrical first section 130, as also shown. When passing through the inlet 142, and more specifically, from the wider, first passageway (first section 130 of the inlet 142) and through the narrower, second passageway (inlet passageway 144 of the inlet 142), the matrix is subjected to the first cavitation by reduction in diameter. This first cavitation takes place by "vena contracta" and is physically governed by the Bernoulli equation.

As shown in FIG. 4, the second reactor 140 comprises a sidewall or shell 170, in which the inlet 142 is formed. The shell 170 encloses an internal space or chamber 180 in fluid communication with the inlet 142. An inner surface or wall 172 of the shell 170 delimits the internal chamber 180 and includes a first cylindrical section 174, a conical section 176 following (and widening from) the first cylindrical section 174 and a second cylindrical section 178 following the conical section 176. The first cylindrical section 174 is relatively wide. The conical section 176 extends from a relatively narrow upstream end 176a (which can include a cylindrical neck 176b, as shown), to a relatively wider downstream end 176c, from which the cylindrical section 178 extends. In consequence, the internal chamber 180 comprises a first cylindrical space 184, a widening, conical space 186 and a second cylindrical space 188, delimited respectively by the first cylindrical section 174, conical section 176 and second cylindrical section 178 of the inner wall 172 of the shell 170. The internal chamber 180 can further include a cylindrical neck space 186b delimited by the cylindrical neck 176b of the inner wall 172 of the shell 170.

A rotor 190 is arranged within the internal space or chamber 180. The rotor 190 comprises end pins 192, 193 which are rotationally connected to the shell 170 allowing the rotor 190 to rotate within the internal chamber 180 about a rotation axis 191. The rotor 190 includes a relatively narrower, first cylindrical section 194, a conical section 196 extending (and widening) from the first cylindrical section 194 and a relatively wider, second cylindrical section 198 extending from the conical section 196. The first cylindrical section 194, conical section 196 and second cylindrical section 198 of the rotor 190 are respectively arranged along the first cylindrical space 184, conical space 186 and second cylindrical space 188 of the internal chamber 180, there being a gap or separation between the outer surface of the rotor 190 and the inner wall 172 of the shell 170 which delimits the internal chamber 180. As further shown, the gap between the conical section 196 of the rotor 190 and the conical section 176 of the inner wall 172 of the shell 170 may not be uniform, but rather increasingly wide, the closer to the second cylindrical section 198 of the rotor 190, and the (constant) gap between the second cylindrical section 198 of the rotor 190 and the second cylindrical section 178 of the inner wall 172 of the shell 170 can be wider than the gap between the conical section 196 of the rotor 190 and the conical section 176 of the inner wall 172 and the upstream end 176*a* of the conical section 176. On an outer surface of the rotor 190, and more particularly of the conical section 196 and second cylindrical section 198, the rotor is equipped with recesses or blind holes 199.

With continued reference to FIG. 4, the narrower, inlet passageway 144 is in fluid communication with an inlet 181 of the internal chamber 180 of the second reactor 140, such that the matrix passing through the inlet passageway 144 is projected into a wider space (the first cylindrical space 184 of the internal chamber 180) through the inlet 181 of the internal chamber 180. While effects of the first cavitation on the matrix are in their culminating phase, the matrix is subjected to a second cavitation by a sudden enlargement of the diameter of the conduit, specifically by passing from the narrower, inlet passageway 144 to the wider, first cylindrical space 184 of the internal chamber 180 through the inlet 181. Similarly to the first cavitation, the second cavitation is hydrodynamic. However, the second cavitation is inverse to the first cavitation because the fluid which is compressed in the "vena contracta" (inlet passageway 144) suddenly enters a much larger environment (first cylindrical space 184). In consequence, a fast slowing down of the fluid and therefore sudden change in pressure in the fluid takes place, causing a cavitation due to enlargement of the fluid passageway section in the direction of the flow.

Once the liquid or liquid-solid matrix enters in the internal chamber 180 from the inlet passageway 144, the matrix flows through internal chamber 180 and exits the internal chamber 180 through an outlet 182. While the liquid or liquid-solid matrix passes through the internal chamber 180, the rotor 190 rotates inside—and relative to—the shell 170 about the rotation axis 191. The pressure difference existing in the different spatial volumes or gaps of the internal chamber 180 allows the bubbles created by the first controlled cavitation in the "vena contracta" (inlet passageway 144) and the bubbles created by the second controlled cavitation in the enlargement zone (first cylindrical space 184) after the "vena contracta" to be sucked together into and through the upper median part of the internal chamber 180 (i.e. through the conical space 186) with the fluid mass and to be subjected to a subsequent synergistic, third cavitation which is also hydrodynamic and is caused by rotation. More specifically, the third cavitation is generated by the fast revolution of the rotor 190, and is enhanced by the blind holes 199 on the rotor surface increasing turbulence within the flowing matrix. The third cavitation is also enhanced by the fact that the conicity (i.e. angle relative to the rotation axis 191) of the conical section 196 of the rotor 190 is different than the conicity of the conical section 176 of the inner wall 172 of the shell 170 (i.e. that the gap between the conical section 176 of the inner wall 172 and the conical section 196 of the rotor 190 increases downstream). The effects of the third cavitation take place while those of the first and second cavitation are still present. In addition to the third cavitation, a suction effect is also obtained; specifically, the fluid slowed down by the transition from the "vena contracta" (fluid passageway 144) to the wider, internal chamber 180, is aspired upwards or downstream as it begins its rotation, acquiring tangential velocity. Furthermore, the different conicity of the conical section 196 of the rotor 190 and the conical section 176 of the inner wall 172 of the shell 170 also makes the rotor serve as a pressure diffuser, allowing to recover part of the fluid pressure loss incurred during the previous crossings, especially during the flowing of the matrix through the "vena contracta" (inlet passageway 144). The pressure recovery helps to project the matrix towards the last cavitation processes, which will be hereinafter described.

Following the aforementioned third cavitation, the matrix exits the internal chamber 180 of the second reactor 140 via the outlet 182 and enters a further fluid conduit 200 which is eventually divided into two lateral fluid conduits 204 and 208, as best shown in FIG. 4. The matrix flows through the lateral fluid conduits 204 and 208 and is fed by these conduits into a first lateral chamber 210 and second lateral chamber 230, respectively.

Figure 5:
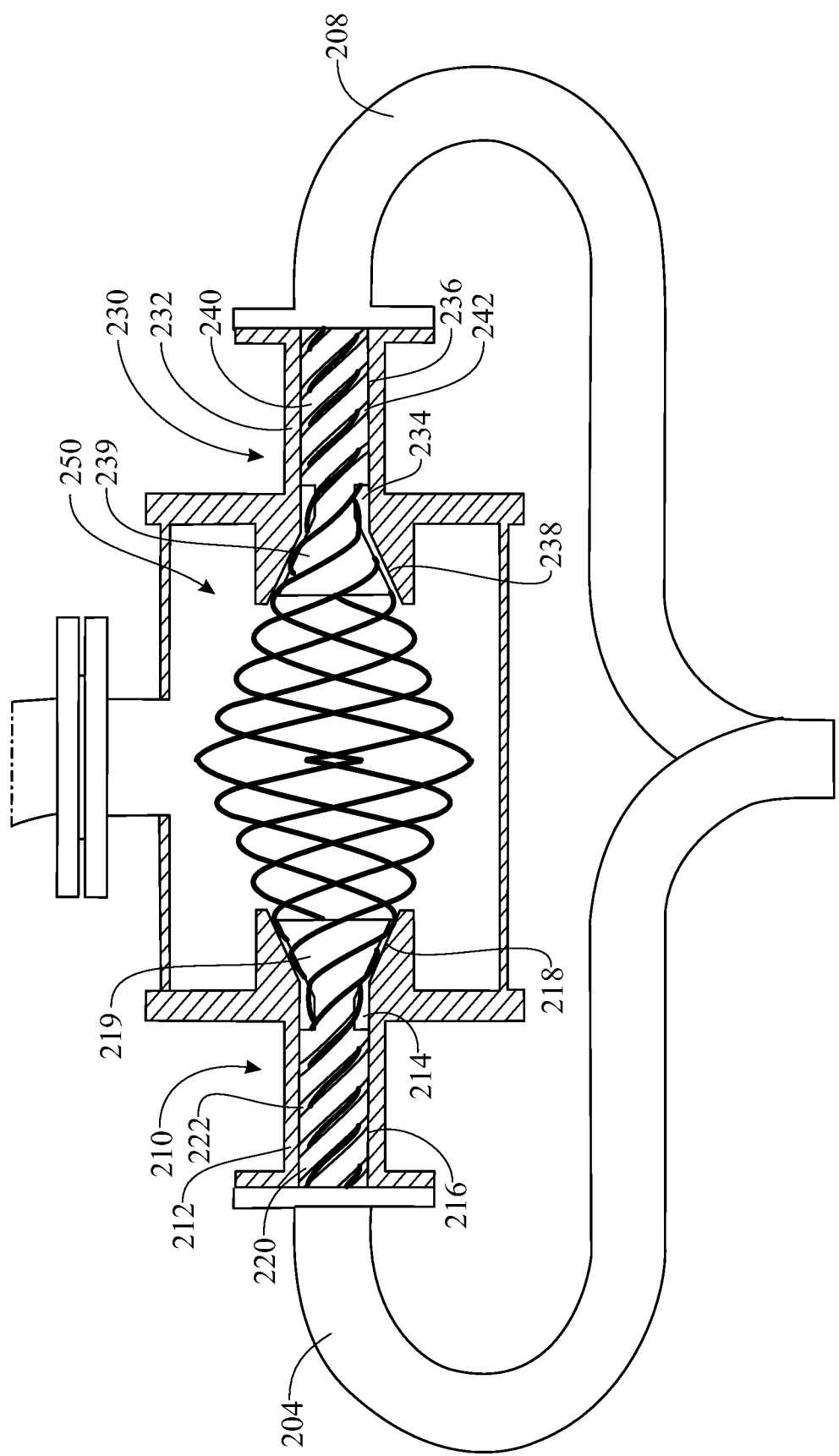
FIG. 5 presents an enlarged front elevation view of the first lateral chamber, second lateral chamber and common fluid chamber of the cavitation apparatus, shown in cross section.

As better shown in FIG. 5, the first lateral chamber 210 comprises a hollow body or chamber shell 212 delimiting an internal space 214. A cylindrical nucleus or body 220 is snugly housed within a first, cylindrical section 216 of the internal space 214 and includes outer, wrapping side grooves 222 facing, and enclosed by, internal walls of the chamber shell 212. In alternative embodiments, the grooves 222 can be replaced with fluid conduits or guides welded or otherwise arranged around the cylindrical nucleus or body 220. The enclosed, wrapping side grooves 222 form at least one coiled or helicoid fluid passageway which extends along the perimeter and length of the cylindrical body 220 and is in fluid communication with the lateral fluid conduit 204. Thus, the matrix flowing through the lateral fluid conduit 204 enters the first lateral chamber 210 and circulates through the helicoid fluid passageway defined by the wrapping side grooves 222 and the chamber shell 212, and said circulation imparts a rotary momentum to the fluid. Downstream of the cylindrical body 220 and helicoid fluid passageway, the internal space 214 of the chamber shell 212 further includes a second, conical section 218 extending from the cylindrical section 216 and in fluid communication with an enlarged middle space or common fluid chamber 250. A conical body 219, in turn, extends from the cylindrical body 220 and is arranged inside the conical section 218 of the internal space 214, with a gap being formed between the outer conical surface of the conical body 219 and an internal conical wall of the chamber shell 212 which delimits the conical section 218 of the internal space 214. The conical gap provides a widening, transition cavity for the matrix material flowing into the common fluid chamber 250 from the helicoid fluid passageway. As the spirally-moving matrix material flows through the conical section 218, helicoidally around the conical body 219, the diameter of the spiral trajectory increases as shown in FIG. 5, to widen the flow of matrix material into the common fluid chamber 250, so that a conical vortex of matrix is delivered into the common fluid chamber 250 as shown.

The second lateral chamber 230 is a twin of the first lateral chamber 210. As such, the second lateral chamber 230 of the present embodiment comprises a hollow body or chamber shell 232 delimiting an internal space 234 having a first, cylindrical section 236 followed by a widening, conical section 238 which ends in the common fluid chamber 250. A cylindrical nucleus or body 240 is snugly housed within the cylindrical section 236 of the internal space 234 and includes outer, wrapping side grooves 242 enclosed by internal walls of the chamber shell 232, providing at least one coiled or helicoid fluid passageway which extends along the perimeter and length of the cylindrical body 240 and is in fluid communication with the lateral fluid conduit 208, allowing the matrix to acquire a rotary or vortex motion as it passes through the helicoid fluid passageway. A conical body 239 follows the cylindrical body 240 and is non-snugly arranged in the conical section 238 of the internal space 234 such that a conical gap is provided around the cylindrical body 240 which allows to increase the diameter of the vortex and push the vortex outwards.

As shown in FIG. 5, the wrapping side grooves 222 and 242 of the first and second lateral chambers 210 and 230 are preferably disposed such that the matrix vortex flowing into the common fluid chamber 250 from the wrapping side grooves 222 and the matrix vortex flowing into the common fluid chamber 250 from the wrapping side grooves 242 flow in the same direction (e.g., both clockwise or both counterclockwise) such that the two flows of fluid collide in the common fluid chamber 250 with opposing rotatory motion.

The geometry of the first lateral chamber 210 causes two further cavitations in the matrix. Specifically, the fast rotation of the flow through the helicoid passageway(s) defined by the wrapping side grooves 222 (or by helicoid guides welded or otherwise arranged around the cylindrical nucleus or body 220) causes a fourth hydrodynamic cavitation by rotation. In turn, the widening of said vortex diameter due to the conical shape of the gap between the conical body 219 and an inner wall of the chamber shell 212 delimiting the conical section 218 of the internal space 214 causes a fifth sonic or acoustic cavitation due to the formation of ultrasonic waves generated by a fast alternating of pressure decrease and pressure increase in which the bubbles first are formed and, then, rapidly collapse on themselves due to the very high pressure increase. The geometry of the second lateral chamber 230 provides the same effects. I.e., the fast rotation of the flow through the helicoid passageway(s) defined by the wrapping side grooves 242 (or defined by guides welded or otherwise around the cylindrical nucleus or body 240) cause a sixth hydrodynamic cavitation by rotation. In turn, the widening of said vortex diameter due to the conical gap formed between the conical body 239 and internal walls of the chamber shell 232 delimiting the conical section 238 of the internal space 234 causes a seventh sonic or acoustic cavitation due to the formation of ultrasonic waves generated by the fast alternating of depression and pressure, by which the bubbles first are formed and, then, rapidly collapse on themselves due to the very high pressure increase. As shown, the matrix from the first lateral chamber 210 and the matrix from the second lateral chamber 230 collide in the common fluid chamber 250 with opposing rotatory motion. The collision of the two flows enhances the effects of the rotation and sonic cavitations taking place in each respective matrix flowing into the common fluid chamber 250 from the first and second lateral chambers 210 and 230. As the fluid vortexes collide with opposing rotary motion, each ultrasonic wave is summed to those that come in the opposite direction, maximizing the effect of both the rotation and the sonic cavitations. The apparatus 100 is preferably configured such that the effects of the rotation and sonic cavitations are added to, or overlapped with, the still-in-progress effects of the previous cavitations. Such overlapping enhances all cavitations that are taking place as the molecules of the fluid have been previously excited and have therefore loosely lost the bonds of the Wan Der Waals Forces between the molecules.

With reference to FIG. 2, once the matrix has been subjected to the sonic cavitations within the common fluid chamber 250, the matrix flows to an output fluid conduit 260 terminating in an outlet 264 of the cavitation apparatus 100. In some embodiments, the matrix obtained at the outlet 264 of the cavitation apparatus 100 can be directed back to the inlet 102 of the cavitation apparatus 100 and subjected to a new multiple-cavitation cycle by the cavitation apparatus 100. In other embodiments, the matrix obtained at the outlet 264 of the cavitation apparatus 100 can be used for a variety of alternative purposes.

Thus, the cavitation apparatus 100 is characterized by a succession of chambers and diameter-varying conduits which carry out multiple, different types of cavitations on the matrix. More specifically, the cavitation apparatus 100 disclosed herein is configured to perform at least seven different simultaneous cavitations in the same geometric space: a first hydraulic cavitation, a second hydraulic cavitation, a third rotation cavitation, a fourth rotation cavitation, a fifth sonic cavitation, a sixth rotation cavitation and a seventh sonic cavitation. The fluid conduits or piping are specially configured to transport the matrix between the chambers and diameter-varying conduits sufficiently rapidly such that the matrix is subjected to a subsequent cavitation while the effect of a previous cavitation is still present. This synergistic overlapping of cavitation effects produces an extremely effective and rapid overall cavitation of the matrix by the cavitation apparatus 100.

In the event that the matrix is a solid-liquid material, solids immerged in the liquid can be fractured by the cavitation apparatus 100 into smaller pieces (3-100 mm in diameter, for instance and without limitation) through the cavitation processes. Smaller resulting particles will have a better dispersion and greater surface area. Such significant particle size reduction is possible because of the alternation between low and high pressures, which is the base of each type of cavitation and causes an intense mechanical and thermal activity on the solids present in the liquid solution. This alternation of pressures and the high thermal value that is created within each micro-bubble generates extremely intense mechanical forces in the fluid. Macroscopically, these alternations pulverize what exists in the fluid; microscopically, they produce a cracking of macromolecules that is more than excellent for an efficient thermal cracking, catalytic cracking, and hydrocracking.

Furthermore, the cavitation apparatus 100 provides considerable energy savings as the apparatus also works as a diffuser, allowing a remarkable recovery of the pressure drop due to the load losses of the processed liquid. The diffusing effect is provided by the geometry of the interiors of the spaces, and more specifically by the alternation of enlarged and restricted spaces in each passage. Such alternation allows to fluid-dynamically increase the output pressure of the fluid with respect to the incoming one. While there may exist an overall loss of pressure, said overall loss is extremely small.

As mentioned heretofore, the cavitation apparatus 100 disclosed herein provides significant advantages, even if constructed in compact size. In some embodiments, the cavitation apparatus 100 disclosed herein can be successfully incorporated to or integrated within larger industrial processes. In other embodiments, the cavitation apparatus 100 can run autonomously or can be a stand-alone process that interacts with other processes.

Alternative embodiments of the invention are contemplated in which different parts of the disclosed cavitation apparatus 100 can be removed or reordered in dependence of factors such as the specific type of liquid or liquid-solid matrix material to be treated, and the desired streamlining for the specific matrix material to be treated. For example, the geometry of the cavitation apparatus 100 can be easily and quickly reconfigured if needed to treat very dense, viscous and/or granular matrix materials, even with the removal of some of its parts. In another example, the first reactor 110, which also performs mixer functions in the presence of fluids having solid particles, can be removed and/or replaced with a grinding pump. In yet another example, it is contemplated that the sonic cavitation can be performed prior to the hydraulic and rotational cavitations. The cavitation apparatus 100 can also be set up with PED (Pressure Equipment Directive) or ATEX (ATmosphere EXplosible) specifications.

In some embodiments, accessory elements or parts may be added to the cavitation apparatus 100 if required. For instance and without limitation, depending on the needs of the process, the cavitation apparatus 100 may be provided with one or more filters that may be of various shapes and nature (e.g., graphene filter, monolayer graphene filter, membrane filter, magnetic filter, etc.). In some embodiments, these filters may be positioned on the apparatus at the inlet 102 of the cavitation apparatus 100 and/or at the outlet 264 of the cavitation apparatus 100 to perform a first filtration before treatment and/or a last filtration after treatment, respectively. The filters can be accessible for easy replacement by the end user.

In another example, an ozonator can be added to the cavitation apparatus 100, to transform 02 atmospheric oxygen into 03 ozone and inject said ozone preferably into the fluid flowing towards the first reactor 110 or into the first reactor 110. The injected ozone provides greater oxidizing power and is capable of effectively breaking down bacterial charges and odor molecules.

In another example, one or more insuflators can be added to the cavitation apparatus 100 to feed gas into the cavitation apparatus 100 for the treatment of the matrix, preferably before or with ozone feeding into the first reactor 110. The insuflators can in turn be fed with gas from one or more gas storage cylinders which can be accessible from outside the apparatus and topped up directly by the user.

In some embodiments, as shown in phantom lines in FIG. 2, the liquid or liquid-solid matrix can enter the cavitation apparatus 100 through a tank 270 of adequate size (e.g., 200 gallons). The tank 270 can perform one or more of several functions. On one hand, the tank 270 can serve as a storage tank allowing to be permanently provided or stocked with matrix material, so that the pump 106 always has a reserve of liquid to draw on and therefore can maintain an adequate level of flow through the fluid conduit 104. Alternatively or additionally, the tank 270 can serve as a loop tank, by which treated matrix material delivered at the outlet 264 can be recirculated to the tank 270 and then fed back into the cavitation apparatus 100 through the inlet 102 for repeated processing, as mentioned heretofore. Alternatively or additionally, if needed, chemicals and gases can be added to the matrix material in the tank 270 from other suitable tanks (e.g., day tank, micro tank, etc.) or sources.

Tests have been conducted which have shown that the cavitation process carried out by the cavitation apparatus 100 polarizes salts and polar molecules which may be present in the liquid. Polarization is further accentuated by the presence of the aforementioned magnetic unit 150.

The cavitation apparatus 100 can be constructed relatively compact in size and can be portable and/or autonomous. In some embodiments, the cavitation apparatus 100 and its accessories can be housed within one or more container. The container or containers can be of any size, and the dimensions may depend on the exact configuration of the apparatus and/or requirement(s) given by its application of use. For instance and without limitation, the apparatus can be housed in a standard, 10-foot container to allow a universal positioning. In different embodiments of the invention, the one or more containers can be refrigerated or non-refrigerated. It is preferable to use a refrigerated container as the insulation will also hide the noise of the motors and the refrigerating system will ensure an optimal continuous operation. In many cases, it is preferably to enclose the apparatus in a single, standard-sized refrigerated container to maximize portability, universality of installation, noise insulation and optimal continuous operation. In the event that the one or more containers are non-refrigerated, the apparatus can include air exchange systems configured to cause proper air diffusion and thereby prevent an excessive increase of operating temperatures.

The cavitation apparatus 100 can further include autonomous energy production systems configured to power the cavitation process and any kind of application. For example, the apparatus can be provided with a solar panel system (photovoltaic, thermodynamic, etc.), a micro wind system or a generator. The energy production systems can be provided with an energy storage system, such as one or more groups of accumulation batteries, allowing to power the apparatus (e.g., to power one or more refrigerated containers housing the apparatus) even when the apparatus is not connected to the energy grid.

In summary, a cavitation apparatus is disclosed and particularly configured for fast modification of complex fluids composed of various compounds, using cavity implosion energy to improve the homogeneity, viscosity, and/or other physical characteristics of the fluids and/or possible solids carried by the fluids, altering their chemical composition and converting compounds to obtain different products, by carrying out multiple, different cavitation processes within the same apparatus which take place simultaneously and in synergy with each other. The simultaneous and synergistic cavitation processes coexist harmonically, to such an extent that there are no significant vibrations, and further implement the efficiency of the chemical, physical and biological processes that take place inside the apparatus. The cavitation process provided by the cavitation apparatus is independent of external temperatures and pressure and provides a means of changing the chemical composition, physical properties and other characteristics of fluids and/or solids evenly throughout the fluids and/or solids. The liquid or liquid-solid matrix material may be subjected to one cavitation session or single pass through the apparatus; alternatively, the liquid or liquid-solid material may be subjected to two or more cavitation sessions, through a loop which allows the matrix to pass through the apparatus two or more times. Chemicals or gases may be additionally fed to the apparatus to improve the desired effects on the matrix. The apparatus can include a reactor which serves as a mixer. The apparatus can include accessory elements suitable for almost any use, such as for producing electricity. Furthermore, the constructive geometry of the apparatus enables the apparatus to work as a diffuser, allowing for a drastic reduction of energy consumption. Finally, the apparatus can be easily and quickly reconfigured in dependence of the required use; some of its parts can be removed or replaced if there is the needed to treat very dense and/or viscous liquids, and/or matrix materials with extensive granularity.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A cavitation apparatus, comprising:
a set of two or more cavitation units, wherein
a first cavitation unit of the set of two or more cavitation units is configured to carry out at least one first cavitation process on a material flowing through the first cavitation unit, and further wherein
a second cavitation unit of the set of two or more cavitation units is configured to carry, out at least one second cavitation process on said material from the first cavitation unit while effects of said at least one first cavitation process are present in said material; and further wherein
the set of two or more cavitation units comprises a cavitation unit having an internal chamber delimited by a shell configured to act as a stator and a rotor housed within the internal chamber, wherein the rotor and stator are spaced apart and configured to allow a material to flow therebetween from an inlet of the internal chamber to an outlet of the internal chamber, and further wherein the cavitation unit is configured to cause cavitation of the material flowing through the internal chamber by rotation of the rotor; and wherein
the rotor comprises a conical section arranged within a conical space of the internal chamber that is delimited by a conical section of an inner wall of the shell, the conical section of the rotor having a smaller conicity than the conical section of the inner wall of the shell.

2. The cavitation apparatus of claim 1, further comprising an inlet in fluid communication with a first fluid conduit, which in turn is provided in fluid communication with the first cavitation unit and configured to allow the material to flow from the inlet to the first cavitation unit.

3. The cavitation apparatus of claim 2, further comprising an outlet in fluid communication with the inlet such that material exiting the cavitation apparatus via the outlet is directed back to the inlet and into the cavitation apparatus via the inlet.

4. The cavitation apparatus of claim 2, further comprising a pump configured to pump a material from the inlet, through the first fluid conduit and into the first cavitation unit.

5. The cavitation apparatus of claim 2, further comprising a magnetic unit alongside the first fluid conduit, the magnetic unit comprising at least one magnet configured to provide a magnetic field to a material flowing through the first fluid conduit.

6. The cavitation apparatus of claim 2, further comprising a feeding unit in fluid communication with the first fluid conduit and configured to enable the feeding of a gas and/or chemical into the first fluid conduit.

7. The cavitation apparatus of claim 1, further comprising at least one mixer configured to mix and homogenize said material.

8. The cavitation apparatus of claim 7, wherein the at least one mixer comprises a reactor having an internal chamber configured to receive and allow flowing therethrough of a material from the first fluid conduit towards an outlet of the internal chamber, the reactor comprising a plurality of obstacles arranged within the internal chamber and configured to increase turbulence of and homogenize said material flowing through the internal chamber.

9. The cavitation apparatus of claim 8, wherein the plurality of obstacles comprises at least one of a leave-shaped obstacle and a droplet-shaped obstacle.

10. The cavitation apparatus of claim 1, further comprising a grinding pump configured to grind said material.

11. The cavitation apparatus of claim 1, wherein the set of two or more cavitation units comprises a cavitation unit having a first fluid passageway followed by a second fluid passageway which is narrower than the first passageway, and further wherein the cavitation unit is configured to cause cavitation of a material flowing from the first fluid passageway into the narrower, second fluid passageway.

12. The cavitation apparatus of claim 1, wherein the set of two or more cavitation units comprises a cavitation unit having a fluid passageway in fluid communication with an internal chamber which is wider than the fluid passageway, and further wherein the cavitation unit is configured to cause cavitation of a material flowing from the fluid passageway, into the wider internal chamber.

13. The cavitation apparatus of claim 1, wherein the rotor comprises an outer surface provided with blind holes configured to promote turbulence in the material flowing between the rotor and the shell.

14. The cavitation apparatus of claim 1, wherein the set of two or more cavitation units comprises a first chamber and a second chamber feeding a respective part of said material into a common fluid chamber such that a collision between the respective parts of the material takes place inside the common fluid chamber, wherein each one of the first chamber and second chamber comprises a respective helicoid fluid passageway configured to impart a rotary momentum to the respective part of the material, creating a vortex of said respective part of the material and causing a rotary cavitation in the respective part of the material, and wherein each one of the first chamber and second chamber comprises a conical helicoid fluid passageway section configured to increase the diameter of said vortex and cause an acoustic cavitation in the respective part of the material, such that said rotary and acoustic cavitations are produced in the respective part of the material prior to delivering said respective part of the material to the common fluid chamber, wherein the collision takes place while effects of the rotary and acoustic cavitations are still present in said respective parts of the material subjected to the collision.

15. The cavitation apparatus of claim 14, wherein the first and second chambers are comprised in the second cavitation unit, and the collision takes place while effects of said at least one first cavitation process are still present in said respective parts of the material subjected to the collision.

16. The cavitation apparatus of claim 14, wherein the first and second chambers are opposed to one another and the respective helicoid fluid passageways are configured to impart same rotary momentums to the respective part of the material such that the collision takes place with opposed rotary motion of the vortexes.

17. A cavitation apparatus, comprising:

a set of two or more cavitation units, wherein a first cavitation unit of the set of two or more cavitation units is configured to carry out at least one first cavitation process on a material flowing through the first cavitation unit, wherein a second cavitation unit of the set of two or more cavitation units is configured to carry, out at least one second cavitation process on said material from the first cavitation unit while effects of said at least one first cavitation process are present in said material; and further wherein one of the first and second cavitation units comprises a first chamber and a second chamber feeding a respective part of said material into a common fluid chamber such that a collision between the respective parts of the material takes place inside the common fluid chamber, wherein each one of the first chamber and second chamber comprises a respective helicoid fluid passageway configured to impart a rotary momentum to the respective part of the material, creating a vortex of said respective part of the material and causing a rotary cavitation in the respective part of the material, and wherein each one of the first chamber and second chamber comprises a conical helicoid fluid passageway section configured to increase the diameter of said vortex and cause an acoustic cavitation in the respective part of the material, such that said rotary and acoustic cavitations are produced in the respective part of the material prior to delivering said respective part of the material to the common fluid chamber, wherein the collision takes place while effects of the rotary and acoustic cavitations are still present in said respective parts of the material subjected to the collision, and further wherein the first and second chambers are opposed to one another and the respective helicoid fluid passageways are configured to impart same rotary momentums to the respective part of the material such that the collision takes place with opposed rotary motion of the vortexes.

18. A cavitation apparatus, comprising:

a set of two or more cavitation units, wherein a first cavitation unit of the set of two or more cavitation units is configured to carry out at least one first cavitation process on a material flowing through the first cavitation unit, wherein a second cavitation unit of the set of two or more cavitation units is configured to carry out at least one second cavitation process on said material from the first cavitation unit while effects of said at least one first cavitation process are present in said material; and further wherein the second cavitation unit comprises a first chamber and a second chamber feeding a respective part of said material into a common fluid chamber such that a collision between the respective parts of the material takes place inside the common fluid chamber, wherein each one of the first chamber and second chamber comprises a respective helicoid fluid passageway configured to impart a rotary momentum to the respective part of the material, creating a vortex of said respective part of the material and causing a rotary cavitation in the respective part of the material, and wherein each one of the first chamber and second chamber comprises a conical helicoid fluid passageway section configured to increase the diameter of said vortex and cause an acoustic cavitation in the respective part of the material, such that said rotary and acoustic cavitations are produced in the respective part of the material prior to delivering said respective part of the material to the common fluid chamber; wherein the collision takes place while effects of the rotary and acoustic cavitations and said at least one first cavitation process are still present in said respective parts of the material subjected to the collision, and further wherein the first and second chambers are opposed to one another and the respective helicoid fluid passageways are configured to impart same rotary momentums to the respective part of the material such that the collision takes place with opposed rotary motion of the vortexes.

19. A cavitation apparatus, comprising:

a set of two or more cavitation units, wherein a first cavitation unit of the set of two or more cavitation units is configured to carry out at least one first cavitation process on a material flowing through the first cavitation unit, and further wherein a second cavitation unit of the set of two or more cavitation units is configured to carry out at least one second cavitation process on said material from the first cavitation unit while effects of said at least one first cavitation process are present in said material; and further wherein the set of two or more cavitation units comprises a first chamber and a second chamber feeding a respective part of said material into a common fluid chamber such that a collision between the respective parts of the material takes place inside the common fluid chamber, wherein each one of the first chamber and second chamber comprises a respective helicoid fluid passageway configured to impart a rotary momentum to the respective part of the material, creating a vortex of said respective part of the material and causing a rotary cavitation in the respective part of the material, and wherein each one of the first chamber and second chamber comprises a conical helicoid fluid passageway section configured to increase the diameter of said vortex and cause an acoustic cavitation in the respective part of the material, such that said rotary and acoustic cavitations are produced in the respective part of the material prior to delivering said respective part of the material to the common fluid chamber, wherein the collision takes place while effects of the rotary and acoustic cavitations are still present in said respective parts of the material subjected to the collision.

20. The cavitation apparatus of claim 19, wherein the first and second chambers are comprised in the second cavitation unit, and the collision takes place while effects of said at least one first cavitation process are still present in said respective parts of the material subjected to the collision.

* * * * *